(12) United States Patent
Tang et al.

(10) Patent No.: US 11,422,354 B2
(45) Date of Patent: Aug. 23, 2022

(54) DIGITAL PATHOLOGY SCANNER FOR LARGE-AREA MICROSCOPIC IMAGING

(71) Applicant: DAKEWE (SHENZHEN) MEDICAL EQUIPMENT CO., LTD, Guangdong (CN)

(72) Inventors: Yuhao Tang, Shenzhen (CN); Qiyue Yu, Shenzhen (CN); Junfeng He, Shenzhen (CN); Qingjun Wu, Shenzhen (CN); Jianfei Wei, Shenzhen (CN); Jian Deng, Shenzhen (CN); Yahong Liu, Shenzhen (CN); Xiongbing Zhou, Shenzhen (CN); Yang Wang, Shenzhen (CN)

(73) Assignee: Dakewe (Shenzhen) Medical Equipment Co., Ltd., Shenzhen (CN)

( * ) Notice: Subject to any disclaimer, the term of this patent is extended or adjusted under 35 U.S.C. 154(b) by 0 days.

(21) Appl. No.: 17/266,172

(22) PCT Filed: Jan. 10, 2020

(86) PCT No.: PCT/CN2020/071393
§ 371 (c)(1),
(2) Date: Feb. 5, 2021

(87) PCT Pub. No.: WO2021/000569
PCT Pub. Date: Jan. 7, 2021

(65) Prior Publication Data
US 2021/0311293 A1 Oct. 7, 2021

(30) Foreign Application Priority Data
Jul. 1, 2019 (CN) .......................... 201910586372.X

(51) Int. Cl.
*G02B 21/36* (2006.01)
*G02B 21/02* (2006.01)
*H04N 5/225* (2006.01)

(52) U.S. Cl.
CPC ........... *G02B 21/362* (2013.01); *G02B 21/02* (2013.01); *H04N 5/2258* (2013.01)

(58) Field of Classification Search
CPC .... G02B 21/02; G02B 21/244; G02B 21/362; G02B 21/367; H04N 5/2258
See application file for complete search history.

(56) References Cited

U.S. PATENT DOCUMENTS

| 2002/0079491 | A1 | 6/2002 | Raynor | |
| 2003/0085335 | A1* | 5/2003 | Almogy | ............ G01N 21/9501 250/208.1 |

(Continued)

FOREIGN PATENT DOCUMENTS

| CN | 1604335 A | 4/2005 |
| CN | 201892745 U | 7/2011 |

(Continued)

OTHER PUBLICATIONS

International Search Report, PCT/CN/2020/071393, dated Apr. 8, 2020.

(Continued)

*Primary Examiner* — James T Boylan
(74) *Attorney, Agent, or Firm* — HEA Law PLLC; Darrin A. Auito

(57) ABSTRACT

The disclosure relates to the field of digital pathology imaging technologies, in particular, to a digital pathology scanner for large-area microscopic imaging. The digital pathology scanner for large-area microscopic imaging includes a plurality of microscopic objectives and a plurality of digital image sensors; the microscopic objectives and the (Continued)

digital image sensors are equal in quantity and are fixed relatively in a one-to-one correspondence manner. The digital image sensors are sequentially distributed so as to form a sensor array. The sensor array enables images formed by the digital image sensors to be sequentially distributed without intervals in a second direction when moving in a first direction, wherein the first direction is perpendicular to the second direction.

3 Claims, 3 Drawing Sheets

(56) References Cited

U.S. PATENT DOCUMENTS

| | | | | |
|---|---|---|---|---|
| 2004/0101210 | A1* | 5/2004 | Weinstein | G02B 21/367 382/128 |
| 2004/0223632 | A1 | 11/2004 | Olszak | |
| 2005/0084175 | A1* | 4/2005 | Olszak | G06V 20/693 382/284 |
| 2007/0153370 | A1* | 7/2007 | Olszak | G01J 3/02 359/368 |
| 2008/0095467 | A1* | 4/2008 | Olszak | G02B 21/367 382/284 |
| 2008/0297911 | A1* | 12/2008 | Christenson | B29D 11/00028 359/666 |
| 2013/0242384 | A1* | 9/2013 | Zhou | G02B 21/26 248/346.03 |
| 2014/0118527 | A1* | 5/2014 | Zhou | G02B 21/26 348/79 |
| 2014/0139643 | A1* | 5/2014 | Hogasten | H04N 5/33 348/48 |
| 2019/0162944 | A1* | 5/2019 | Gunzer | G02B 21/004 |

FOREIGN PATENT DOCUMENTS

| | | |
|---|---|---|
| CN | 106488148 A | 3/2017 |
| CN | 109194851 A | 1/2019 |
| CN | 11024445 A | 9/2019 |
| CN | 209911642 U | 1/2020 |

OTHER PUBLICATIONS

Written Opinion of International Search Report, PCT/CN/2020/071393.

Brian McCall et al.: "Toward a low-cost compact array microscopy platform for detection of tuberculosis", TUBERCULOSIS, vol. 91, Oct. 20, 2011, pp. S54-S60.

Extended European Search Report, dated Oct. 15, 2021 (PCT/CN2020071393) (10 pages).

McCall Brian et al.: "Miniature objective lens for array digital pathology: design improvement based on clinical evaluation," Progress in Biomedical Optics and Imaging, SPIE—International Society for Optical Engineering, Bellingham, WA, US, vol. 9791, Mar. 23, 2016.

* cited by examiner

DIGITAL PATHOLOGY SCANNER FOR LARGE-AREA MICROSCOPIC IMAGING

CROSS-REFERENCE TO RELATED APPLICATIONS

This application is a national stage filing under 35 U.S.C. § 371 of international application number PCT/CN2020/071393, filed Jan. 10, 2020, which claims priority to Chinese patent application No. 201910586372X filed Jul. 1, 2019. The contents of these applications are incorporated herein by reference in their entirety.

FIELD

The present disclosure relates to the field of digital pathology imaging technologies, and relates to a digital pathology scanner for large-area microscopic imaging.

BACKGROUND

Digital pathology refers to application of a computer and a network in the field of pathology, which is a technology combining a modern digital system with a traditional optical amplification apparatus. A digital pathology scanner is mainly used to scan a sectioned tissue.

A micro-optical system composed of a microscopic objective and a digital camera is used in a conventional digital pathology scanner to horizontally and longitudinally scan the sectioned tissue. The scanning manner leads to a small scanning area and long scanning time, greatly reduces user experience of the digital pathology scanner, and cannot realize an application value of the digital pathology in practical clinical diagnosis.

SUMMARY

In view of this, the present disclosure provides a digital pathology scanner for large-area microscopic imaging, which mainly aims to solve a technical problem of long time consumed due to a small single scanning area of an existing digital pathology scanner when scanning a sectioned tissue.

In order to achieve the above objective, the present disclosure mainly provides the technical solutions.

An embodiment of the present disclosure provides a digital pathology scanner for large-area microscopic imaging, which includes a plurality of microscopic objectives and a plurality of digital image sensors, wherein the microscopic objectives and the digital image sensors are equal in quantity and are fixed relatively in one-to-one correspondence.

The digital image sensors are sequentially distributed so as to form a sensor array.

The sensor array enables images formed by the digital image sensors to be sequentially distributed without intervals in a second direction when moving in a first direction; and the first direction is perpendicular to the second direction.

According to further arrangement of the present disclosure, the sensor array has N rows distributed in parallel at intervals in the first direction, and N is an integer greater than or equal to 2.

Two adjacent rows are respectively an $N1^{th}$ row and an $N2^{th}$ row in the first direction, $N2=N1+1$, and N1 is an integer greater than or equal to 1; and the $N2^{th}$ row is offset from the $N1^{th}$ row in the second direction by a distance of FoV, and FoV is a size of the image formed by the digital image sensor in the second direction.

According to further arrangement of the present disclosure, the sensor array has N rows distributed in parallel at intervals in the first direction, and N is an integer greater than or equal to 3; the digital image sensors located in outermost two rows in the sensor array are equal in quantity, which is M1, while the digital image sensors located in other rows have a quantity of M2, and $M1=M2+1$.

Two adjacent rows are respectively an $N1^{th}$ row and an $N2^{th}$ row in the first direction, $N2=N1+1$, and N1 is an integer greater than or equal to 1; when N2 is less than N, the $N2^{th}$ row is offset from the $N1^{th}$ row in the second direction by a distance of FoV; when N2 is equal to N, the $N2^{th}$ row protrudes from the $N1^{th}$ row by a distance of FoV in the second direction; and FoV is a size of the image formed by the digital image sensor in the second direction.

According to further arrangement of the present disclosure, more than two digital image sensors are arranged in each row, and are sequentially distributed in the second direction; and a distance between two adjacent digital image sensors in each row in the second direction is equal, and is r1.

According to further arrangement of the present disclosure, N is a smallest integer greater than or equal to $(W+r)/FoV$; and $$r1 = N*FoV - W,$$

wherein, W is a size of the digital sensor in the second direction; and r is a minimum distance capable of being realized by a processing technology of two adjacent digital image sensors in the same row in the second direction.

According to further arrangement of the present disclosure, a distance between the digital image sensors in two adjacent rows in the first direction is r2, and r2 is a minimum distance capable of being realized by a processing technology of the digital image sensors in two adjacent rows in the first direction.

With the above technical solutions, the digital pathology scanner for large-area microscopic imaging of the present disclosure has at least the following beneficial effects.

In the technical solutions provided by the present disclosure, the microscopic objectives and the digital image sensors are all distributed in an array, the microscopic objectives and the digital image sensors are fixed relatively in a one-to-one correspondence manner, when the array moves along the first direction, such as moving longitudinally, the images formed by the digital image sensors are sequentially distributed without intervals in the second direction, so that microscopic images may be photographed and spliced in a parallel manner, thus greatly increasing a speed of pathology scanning, improving user experience of the digital pathology scanner, and truly realizing an application value of digital pathology.

The above description is only an overview of the technical solutions of the present disclosure, in order to better understand the technical means of the present disclosure and implement the technical means according to the contents of the specification, the detailed description is made hereinafter with the preferred the embodiments of the present disclosure and the accompanying drawings.

BRIEF DESCRIPTION OF THE DRAWINGS

The following drawings illustrate examples of various components of embodiments of the disclosure described herein and are for illustrative purposes only. Embodiments of the present disclosure are illustrated by way of example and not limitation in the figures of the accompanying drawings, and in which.

Figure 1:
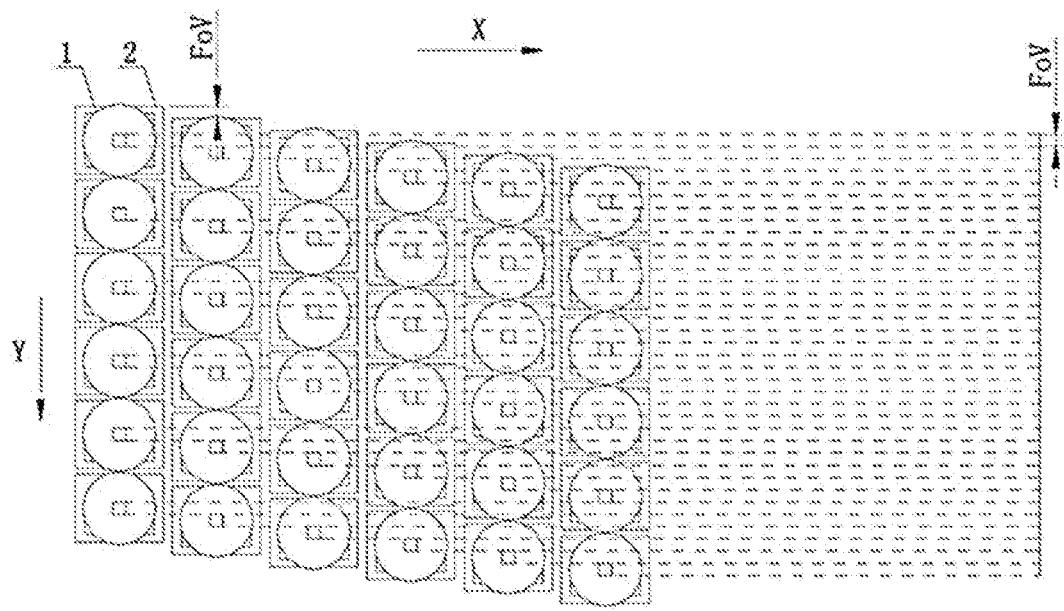
FIG. 1 shows an array distribution manner of a combination of a microscopic objective and a digital image sensor provided by an embodiment of the present disclosure.

In the drawings, numeral 1 refers to a microscopic objective; and numeral 2 refers to a digital image sensor.

DETAILED DESCRIPTION

The technical solutions in the embodiments of the present disclosure are clearly and completely described with reference to the accompanying drawings in the embodiments of the present disclosure. Apparently, the described embodiments are only some but not all of the embodiments of the present disclosure. Based on the embodiments in the present disclosure, all other embodiments obtained by those of ordinary skills in the art without going through any creative work shall fall within the scope of protection of the present disclosure.

It shall be noted that all directional indications (such as upper, lower, left, right, front, rear, etc.) in the embodiments of the present disclosure are only used to explain the relative positional relationship, movement condition, etc. among various components under a certain specific posture (as shown in the drawings), and if the specific posture is changed, the directional indications are also changed accordingly.

Moreover, the descriptions related to "first", "second", etc. in the present disclosure are used for descriptive purposes only and cannot be understood as indicating or implying relative importance, or implicitly indicating the number of technical features indicated thereby. Thus, the feature defined by "first" and "second" may explicitly or implicitly include one or more of the features. In addition, the technical solutions in the embodiments can be combined with each other, which shall be on the basis that the technical solutions can be realized by those of ordinary skills in the art, when the combination of the technical solutions is contradictory or cannot be realized, it shall be considered that the combination of the technical solutions does not exist and does not fall within the scope of protection of the present disclosure.

Figure 2:
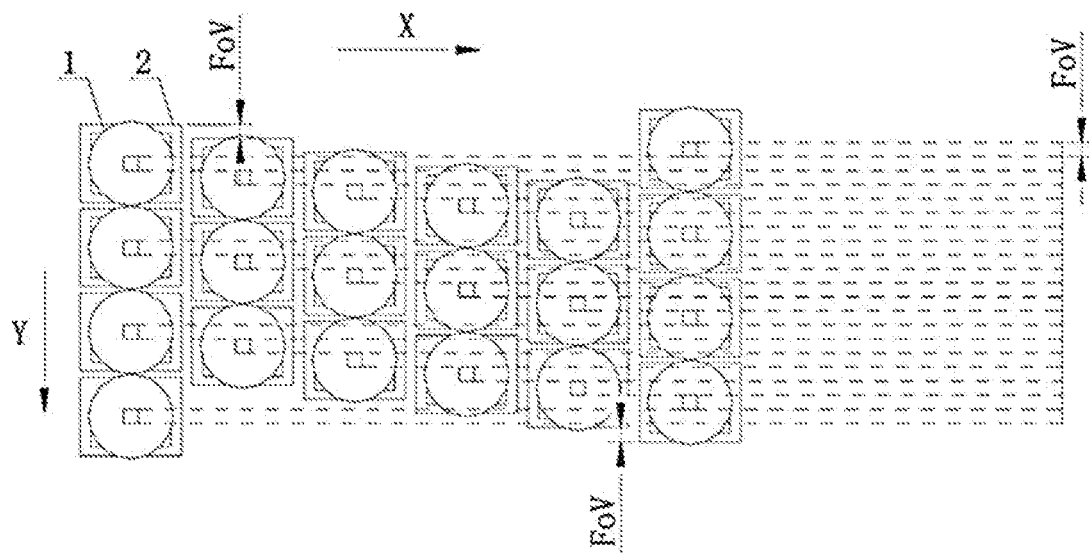
FIG. 2 shows an array distribution manner of a combination of a microscopic objective and a digital image sensor provided by another embodiment of the present disclosure.

With reference to FIG. 1 and FIG. 2, a digital pathology scanner for large-area microscopic imaging provided by an embodiment of the present disclosure includes a plurality of microscopic objectives 1 and a plurality of digital image sensors 2. The microscopic objectives 1 and the digital image sensors 2 are equal in quantity and are fixed relatively in one-to-one correspondence. External light passes through the microscope objective 1 and then irradiates on the digital image sensor 2, and the received light is processed through the digital image sensor 2 and converted into an electrical signal for digital imaging.

The above digital image sensors 2 are sequentially distributed so as to form a sensor array. The sensor array enables images formed by the digital image sensors 2 to be sequentially distributed without intervals in a second direction when moving in a first direction; and the first direction is perpendicular to the second direction. The first direction may be an X direction in FIG. 1 and FIG. 2, and the second direction may be a Y direction in FIG. 1 and FIG. 2.

Specifically, since the digital image sensors 2 are distributed in an array, the microscopic objectives 1 corresponding to the digital image sensors 2 are also distributed in an array. In addition, since the microscopic objectives 1 and the digital image sensors 2 are fixed relatively in a one-to-one correspondence manner, a microscopic objective array formed by the microscopic objectives 1 moves synchronously when a sensor array moves. When the sensor array and the microscopic objective array move together in the first direction, such as the X direction in FIG. 1 and FIG. 2, the microscopic objectives 1 in the microscopic objective array scan all parts of a tissue section at the same time, so that the images formed by the digital image sensors 2 are sequentially distributed without intervals in the second direction, such as the Y direction.

In the above technical solution, when the microscopic objective array and the digital image sensor array linearly scan the tissue section in an unidirection, microscopic images may be photographed and spliced in a parallel manner, and a speed is 20 times faster than that in a conventional method in the prior art, so that user experience of the digital pathology scanner is greatly improved, and an application value of digital pathology is truly realized.

In addition, since the microscopic objectives 1 correspond to the digital image sensors 2, distribution manner and method of the array formed by the microscopic objectives 1 are consistent with those of the sensor array. The distribution manner and method of the sensor array are described in detail hereinafter. Based on knowing the distribution manner of the sensor array, those skilled in the art may deduce the distribution manner of the microscopic objective array.

The digital image sensors 2 in the sensor array may be distributed in many different manners, for example, the digital image sensors may be distributed in an inclined straight line, or in a zigzag pattern.

In an example that the digital image sensors 2 in the sensor array are distributed in the inclined straight line, as shown in FIG. 1, the sensor array may have N rows distributed in parallel at intervals in the first direction. N is an integer greater than or equal to 2. Two adjacent rows are respectively an $N1^{th}$ row and an $N2^{th}$ row in the first direction. $N2=N1+1$, and N1 is an integer greater than or equal to 1. The $N2^{th}$ row is offset from the N1 row in the second direction by a distance of FoV. FoV is a size of the image formed by the digital image sensor 2 in the second direction.

In the above example, $N=6$ is taken as a specific example. As shown in FIG. 1, the sensor array sequentially has a $1^{st}$ row, a $2^{nd}$ row, a $3^{rd}$ row, a $4^{th}$ row, a $5^{th}$ row, and a $6^{th}$ row in the X direction. The $2^{nd}$ row is offset by the FoV in the Y direction relative to the $1^{st}$ row. The $3^{rd}$ row is offset by the FoV in the Y direction relative to the $2^{st}$ row. The $4^{nd}$ row is offset by the FoV in the Y direction relative to the $3^{rd}$ row. The $5^{nd}$ row is offset by the FoV in the Y direction relative to the $4^{th}$ row. The $6^{nd}$ row is offset by the FoV in the Y direction relative to the $5^{th}$ row.

In an example that the digital image sensors 2 in the sensor array are distributed in the zigzag pattern, as shown in FIG. 2, the sensor array has N rows distributed in parallel at intervals in the first direction. N is an integer greater than or equal to 3. The digital image sensors 2 located in outermost two rows in the sensor array are equal in quantity, which is M1. The digital image sensors 2 located in other rows have a quantity of M2, and M1=M2+1. Two adjacent rows are respectively an N1$^{th}$ row and an N2$^{th}$ row in the first direction. N2=N1+1, and N1 is an integer greater than or equal to 1. When N2 is less than N, the N2$^{th}$ row is offset from the N1$^{th}$ row in the second direction by a distance of FoV; when N2 is equal to N, the N2$^{th}$ row protrudes from the N1$^{th}$ row by a distance of FoV in the second direction; and FoV is a size of the image formed by the digital image sensor 2 in the second direction.

In the above example, N=6 is taken as a specific example. As shown in FIG. 2, the sensor array sequentially has a 1$^{st}$ row, a 2$^{nd}$ row, a 3$^{rd}$ row, a 4$^{th}$ row, a 5$^{th}$ row, and a 6$^{th}$ row in the X direction. The digital image sensors 2 in the 1$^{st}$ row and the 6$^{th}$ row are equal in quantity, and the digital image sensors 2 in the 2$^{nd}$ row to the 5$^{th}$ row are equal in quantity. The digital image sensors 2 in the 1$^{st}$ row are one more than the digital image sensors 2 in the 2$^{nd}$ row. The 2$^{nd}$ row is offset by the FoV in the Y direction relative to the 1$^{st}$ row. The 3$^{rd}$ row is offset by the FoV in the Y direction relative to the 2$^{st}$ row. The 4$^{nd}$ row is offset by the FoV in the Y direction relative to the 3$^{rd}$ row. The 5$^{rd}$ row is offset by the FoV in the Y direction relative to the 4$^{th}$ row. The 6$^{nd}$ row protrudes by the FoV in the Y direction relative to the 5$^{st}$ row.

Further, as shown in FIG. 1 and FIG. 2, more than two digital image sensors 2 are arranged in each row, and are sequentially distributed in the second direction. A distance between two adjacent digital image sensors 2 in each row in the second direction is equal, and is r1. Therefore, the sensor array has a more compact structure and a smaller volume.

In a specific application example, corresponding distribution parameters of the above sensor array may be obtained by the following formula. N is a smallest integer greater than or equal to (W+r)/FoV. r1=N*FoV-W. W is a size of the digital sensor in the second direction; and r is a minimum distance capable of being realized by a processing technology of two adjacent digital image sensors 2 in the same row in the second direction.

A distance between the above digital image sensors in two adjacent rows in the first direction is r2, and r2 is a minimum distance capable of being realized by a processing technology of the digital image sensors 2 in two adjacent rows in the first direction.

According to the distribution parameters calculated by the above formula, the sensor array may have a smallest distribution structure. When a tissue section in same size area is scanned, the sensor array distributed by the above method has a smaller volume, and an effective utilization rate of the digital image sensors 2 in the sensor array is higher.

It shall be noted herein that the above FoV may be obtained by image measurement with the digital image sensor 2. The W may be obtained by measuring a size of the digital image sensor. The r may be obtained by process evaluation.

The sensor array distributed in the zigzag pattern is taken as an example hereinafter.

Figure 3:
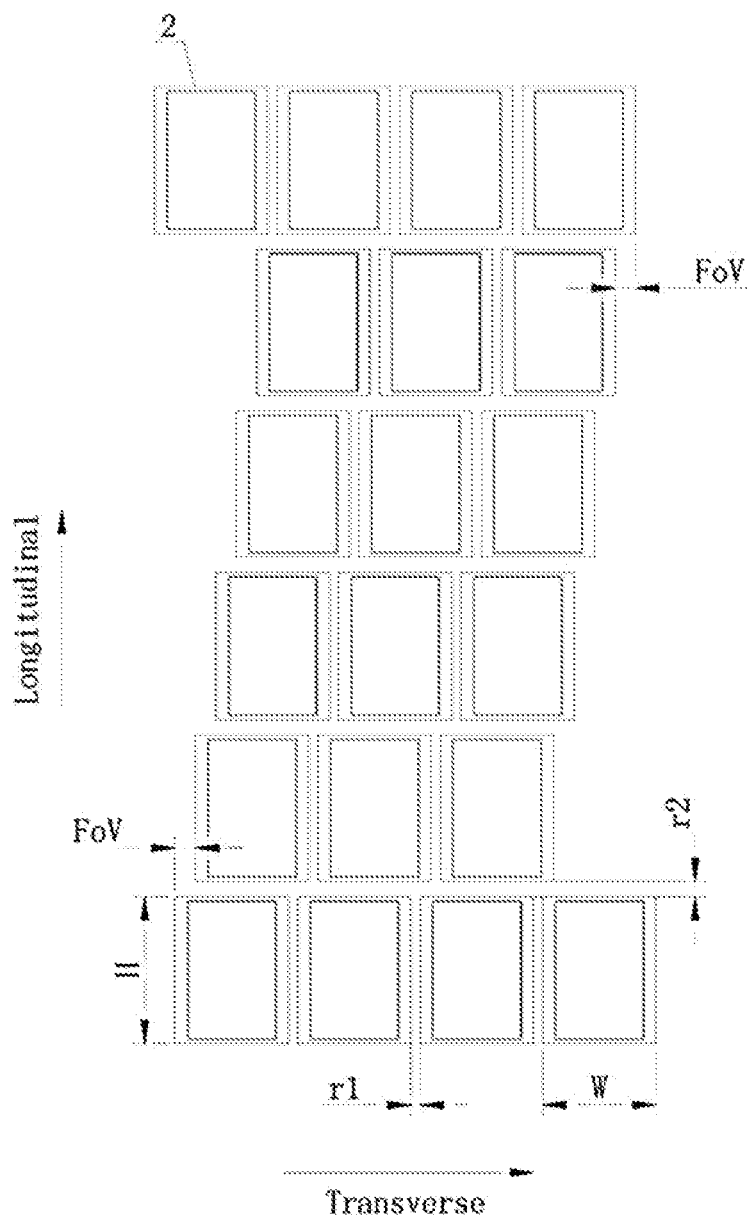
FIG. 3 shows an array distribution manner of a digital image sensor provided by an embodiment of the present disclosure.
Figure 4:
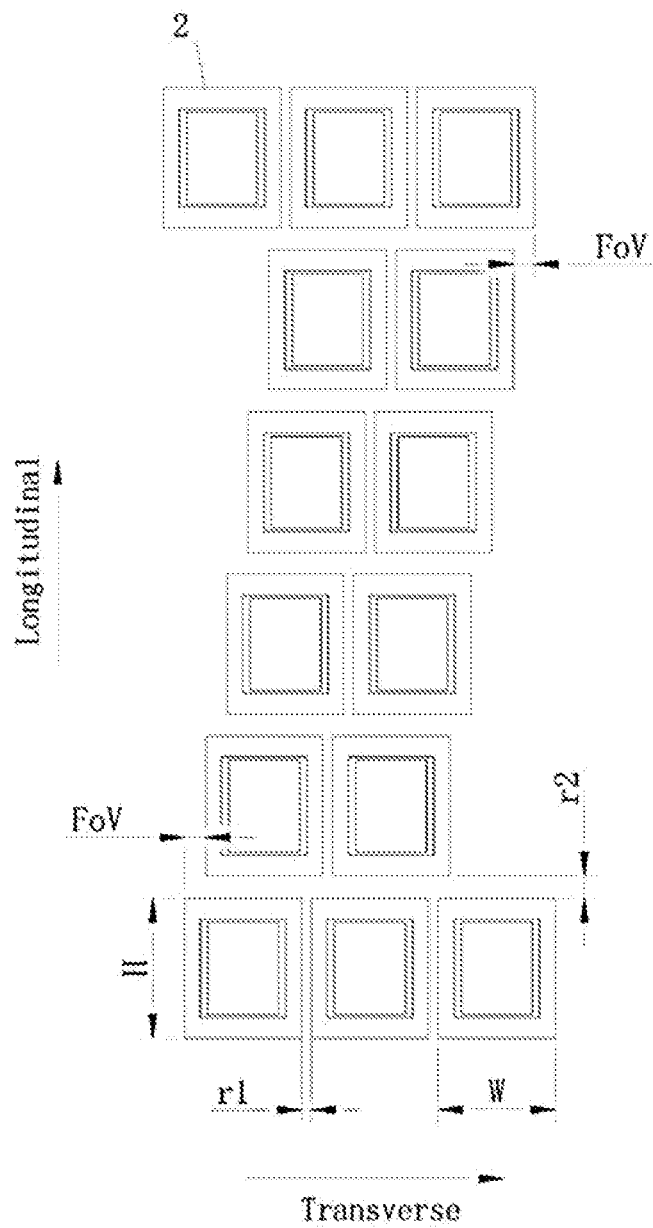
FIG. 4 shows an array distribution manner of a digital image sensor provided by another embodiment of the present disclosure.

In a first embodiment, as shown in FIG. 3, according to the digital image sensor array, the digital image sensor 2 has a size as follows: a width W is 5.18 mm, and a height H is 5.4 mm. An imaging range FoV is 1.0 mm. According to binding and packaging processes of the digital image sensor 2, a minimum horizontal spacing r is 0.8 mm, and a minimum longitudinal spacing r2 is 0.82 mm.

Therefore, a row quantity N of the array is calculated as follows.

$$(W+r)/FoV=(5.18+0.8)/1=5.98. \tag{1}$$

(2) The row quantity N of the array is a smallest integer greater than or equal to 5.98, which means that the row quantity N of the array is equal to 6.

(3) A distance between two adjacent digital image sensors 2 in a same row is r1=N*FoV-W=6*1-5.18=0.82.

A specific quantity of the digital image sensors 2 in each row may be determined according to an actual situation, which is not repeated in detail herein.

In a second embodiment, according to the digital image sensor array, the digital image sensor 2 has a size as follows: a width W is 8.5 mm, and a height H is 8.5 mm. An imaging range FoV is 1.0 mm. According to binding and packaging processes of the digital image sensor 2, a minimum horizontal spacing r is 0.3 mm, and a minimum longitudinal spacing r2 is 0.3 mm.

Therefore, a row quantity N of the array is calculated as follows.

$$(W+r)/FoV=(8.5+0.3)/1=8.8 \tag{1}$$

(2) The row quantity N of the array is a smallest integer greater than or equal to 8.8, which means that the row quantity N of the array is equal to 9.

(3) A distance between two adjacent digital image sensors 2 in a same row is r1=N*FoV-W=9*1-8.5=0.5.

A specific quantity of the digital image sensors 2 in each row may be determined according to an actual situation, which is not repeated in detail herein.

A working principle of the present disclosure is described hereinafter.

In the present disclosure, the microscopic objectives 1 and the digital image sensors 2 are all distributed in an array manner, and are arranged in a same manner, for example, the microscopic objectives and the digital image sensors may be distributed in an inclined straight line, or in a zigzag pattern. The microscopic objective and the digital image sensor are fixed relatively. When the array scans the tissue section in an unidirection, microscopic images may be photographed and spliced in a parallel manner, a speed is 20 times faster than that in a conventional method, a volume is reduced, and a cost is lowered, so that user experience is greatly improved, and an application value of digital pathology is truly realized.

It shall be noted herein that, under a condition of no conflict, those skilled in the art may combine the relevant technical features in the above examples according to the actual situation, so as to achieve the corresponding technical effects, and the various combination situations are not described in detail herein.

The description above is only the preferred embodiments of the present disclosure, and the scope of protection of the present disclosure is not limited to the above embodiment. All technical solutions under the idea of the present disclosure belong to the scope of protection of the present disclosure. It shall be pointed out that for those of ordinary skills in the art, some improvements and embellishments without departing from the principle of the present disclosure shall also be regarded as the scope of protection of the present disclosure.

We claim:
1. A digital pathology scanner for large-area microscopic imaging, comprising:
   a plurality of microscopic objectives; and
   a plurality of digital image sensors, wherein
   the microscopic objectives and the digital image sensors are equal in quantity and fixed relatively in one-to-one correspondence, the digital image sensors are sequentially distributed so as to form a sensor array, the sensor array enables images formed by the digital image sensors to be sequentially distributed without intervals in a second direction when moving in a first direction, and the first direction is perpendicular to the second direction; wherein, the sensor array has N rows distributed in parallel at intervals in the first direction, and N is an integer greater than or equal to (W+r)/FoV;

two adjacent rows are respectively an $N1^{th}$ row and an $N2^{th}$ row in the first direction, N2=N1+1, and N1 is an integer greater than or equal to 1;

the $N2^{th}$ row is offset from the $N1^{th}$ row in the second direction by a distance of FoV, and FoV is a size of the image formed by the digital image sensor in the second direction;

more than two digital image sensors are arranged in each row, and are sequentially distributed in the second direction; and a distance between two adjacent digital image sensors in each row in the second direction is equal to r1, r1=(N*FoV)−W, wherein, W is a size of the digital sensor in the second direction; and r is a minimum distance capable of being realized by a processing technology of two adjacent digital image sensors in the same row in the second direction.

2. The digital pathology scanner for large-area microscopic imaging according to claim 1, wherein, while N is an integer greater than or equal to 3, the digital image sensors located in outermost two rows in the sensor array are equal in quantity, which is M1, while the digital image sensors located in other rows have a quantity of M2, and M1=M2+1.

3. The digital pathology scanner for large-area microscopic imaging according to claim 1, wherein, a distance between the digital image sensors in two adjacent rows in the first direction is r2, and r2 is a minimum distance capable of being realized by a processing technology of the digital image sensors in two adjacent rows in the first direction.

* * * * *